United States Patent [19]
Kubiak

[11] 3,838,555
[45] Oct. 1, 1974

[54] CONTINUOUS ON LINE TUBE HOUSE
[75] Inventor: John W. Kubiak, Minnetonka, Minn.
[73] Assignee: The Torit Corporation, St. Paul, Minn.
[22] Filed: May 7, 1973
[21] Appl. No.: 358,017

Related U.S. Application Data
[63] Continuation of Ser. No. 323,802, Jan. 15, 1973, abandoned.

[52] U.S. Cl.................. 55/96, 55/273, 55/283, 55/286, 55/293, 55/302, 55/341, 55/468
[51] Int. Cl... B01d 46/04, B01d 29/38, B01d 29/10
[58] Field of Search....... 55/302, 341, 96, 273, 361, 55/374, 304, 293, 286, 291, 268, 301, 468, 282, 283, 272

[56]       References Cited
        UNITED STATES PATENTS
3,095,289   6/1963   Egan........................................ 55/96
3,325,979   6/1967   Smith...................................... 55/302
3,345,806   10/1967  Bullock.............................. 55/374 X
3,716,971   2/1973   Reinaver........................... 55/302 X FOREIGN PATENTS OR APPLICATIONS
1,906,526   10/1970  Germany............................. 55/302

OTHER PUBLICATIONS
"Applications of the Coanda Effect" by I. Reba, Scientific American, Volume 214, Number 6 published June 1966.

Primary Examiner—Frank W. Lutter
Assistant Examiner—Neil F. Greenblum
Attorney, Agent, or Firm—Schroeder, Siegfried Ryan and Vidas

[57]  ABSTRACT
A filtering apparatus utilizing tubular filtering elements in a tube house in which a portion of the filtering elements are selectively cleaned during a normal filtering operation to maintain continuous operation and cleaning simultaneously. The improved cleaning apparatus includes special discharge nozzles at the ends of the tubular filtering elements designed to generate an air curtain which follows the contour of a nozzle and provides a pumping action reducing the internal pressure in the filtering elements during the cleaning operation. Simultaneously an externally applied air pulse is generated and applied along the extent of the filter elements to agitate the same which with the reduction in internal pressure removes the particulates from the interior of the filtering elements being cleaned.

27 Claims, 5 Drawing Figures

CONTINUOUS ON LINE TUBE HOUSE

The present application is a continuation in part of my application Ser. No. 323,802, now abandoned, filed Jan. 15, 1973, on "Improvements In Continuous On Line Tube House."

The invention herein discloses a filtering apparatus using a tube house enclosure with tubular fabric type filter elements therein incorporating a cleaning structure having an improved method and apparatus for selectively cleaning the portion of the tubular filter elements in the tube house while the remainder of the filter elements maintain a normal continuous filtering operation.

Tube house filtering apparatus employing tubular bag type fabric filter are well known and in use. There have been a variety of methods in cleaning the tubular filtering element including mechanical shaking, and pneumatic shaking. Similarly, the use of such filtering elements and the cleaning of the same while maintaining a continuous filtering operation or continuous on line cleaning is also recognized and known. In the commonly assigned co-pending application of Roger Wales, Ser. No. 210,898, filed Dec. 22, 1971, and entitled METHOD AND APPARATUS FOR CLEANING TUBE TYPE FABRIC FILTERS one method of pneumatic cleaning is disclosed for a continuous on line filtering operation.

The present invention is directed to an improved structure and method for cleaning the tubular fabric type filter elements in a continuous on line filtering apparatus. This improved method and apparatus includes a creation of an air curtain at the ends of the tubular filtering elements to be cleaned while the remainder of the filtering element in the tube house maintain a normal filtering operation. Simultaneously, with the creation of the air curtain on the selected group of filtering elements to be cleaned, there is a generation of an air pulse applied on the exterior of the respective tubular filtering elements and traveling the extent of the same to coact with the reduction in pressure in the interior of the tubular filtering elements being cleaned to mechanically agitate the same and provide a reverse air flow therethrough to remove particulates from the inner surface of the filtering elements. The particulate will then be deposited in the clean out section of the tube house. The improved method and apparatus provides a special manifold associated with pairs of rows of filtering elements in a tube house in which the externally applied jet burst is generated from a nozzle equidistantly spaced between the filtering elements and between the rows of the filtering elements to asymmetrically apply a mechanical agitation to the individual filtering element shaking the same to remove particulates therefrom. The improved cleaning apparatus requires only a single pulse with the creation of an air curtain at the ends of the filtering element and improved cleaning structure utilizes a hemispherically shaped nozzle so that the air curtain discharge therefrom creates a Coanda effect on the nozzle and a pumping action at the ends of the tubular filtering element to aid in the agitation of the filtering element with the externally applied jet pulse.

In an alternate version of the improved method and apparatus, only one extremity of the filter elements is open through which contaminated air flow is introduced. The cleaning apparatus or tube house utilizes an up flow air pattern so that inlet air is introduced in the contaminate or dust chamber and the contaminants are restricted to the interior of the filter elements and the contaminate for ease in cleaning and maintenance will be hereinafter defined.

It is therefore an object of this invention to provide an improved filtering apparatus and structure for cleaning the same.

Another object of this invention is to provide an improved method of cleaning tubular fabric type filters.

A further object of this invention is to provide an improved tube house filtering structure with a plurality of manifolds having jet cleaned nozzles thereon some of which are located in the ends of the tubular filtering element to create an air curtain therein and others external of the filtering element to pneumatically agitate the same.

A still further object of this invention is to provide an improved filtering apparatus particularly adapted for continuous on-line filtering operation.

These and other objects of this invention will become apparent from reading the attached description together with the drawing thereon.

Figure 4:
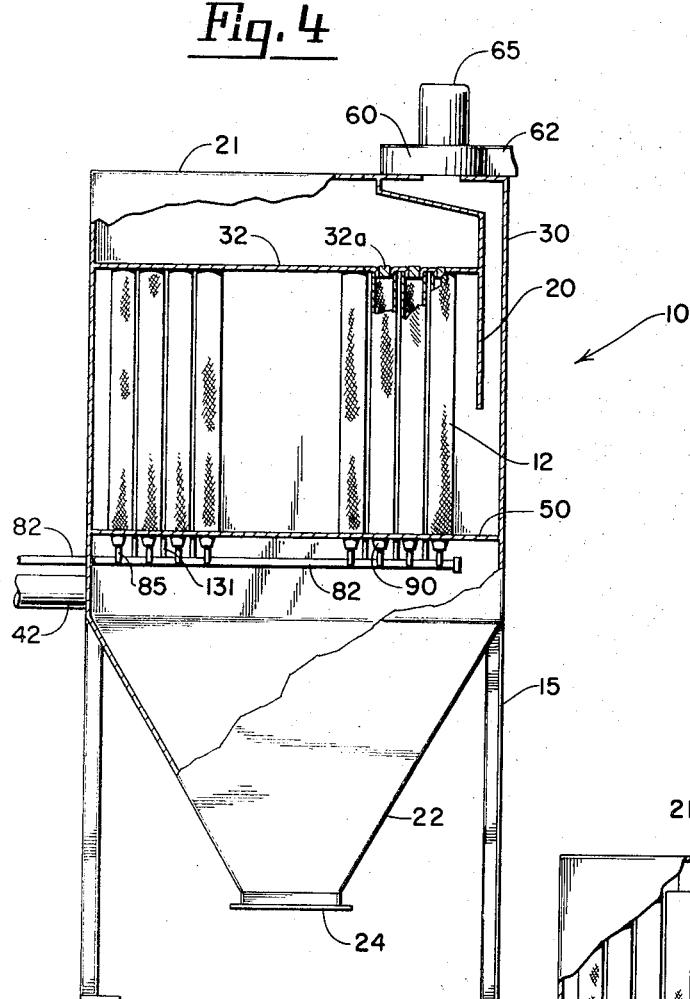
Figure 5:
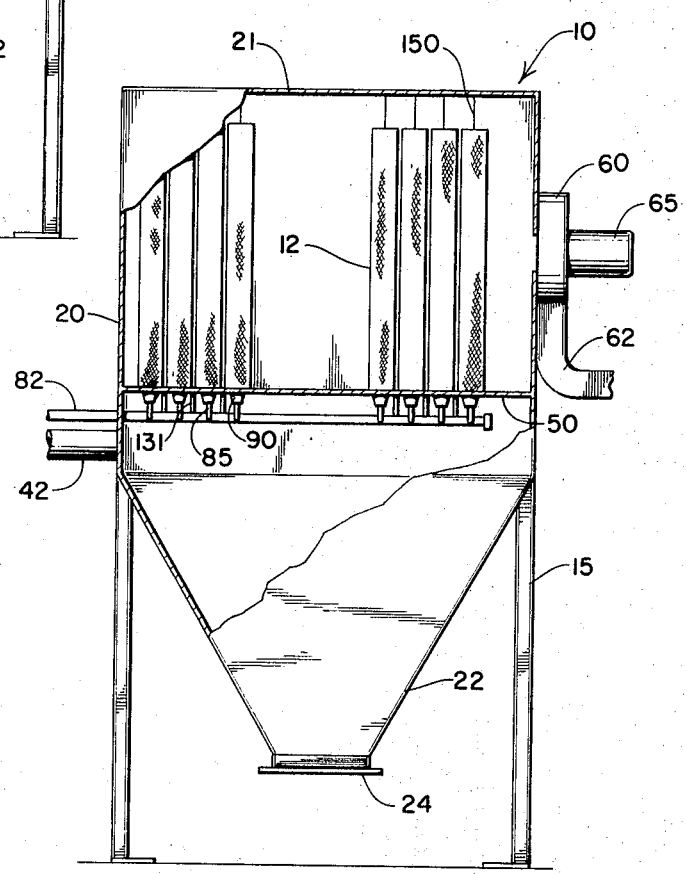

FIG. 4 is an elevation view which deals with parts in section of a tube house type filtering apparatus showing a modified version of the mountings of the filter and an alternate embodiment of the filter cleaning apparatus, and FIG. 5 is an elevation view of parts in section of a further modification of the tube house type filtering apparatus showing a modified mounting of the filter elements for the alternate embodiment of the filter cleaning apparatus.

Figure 1:
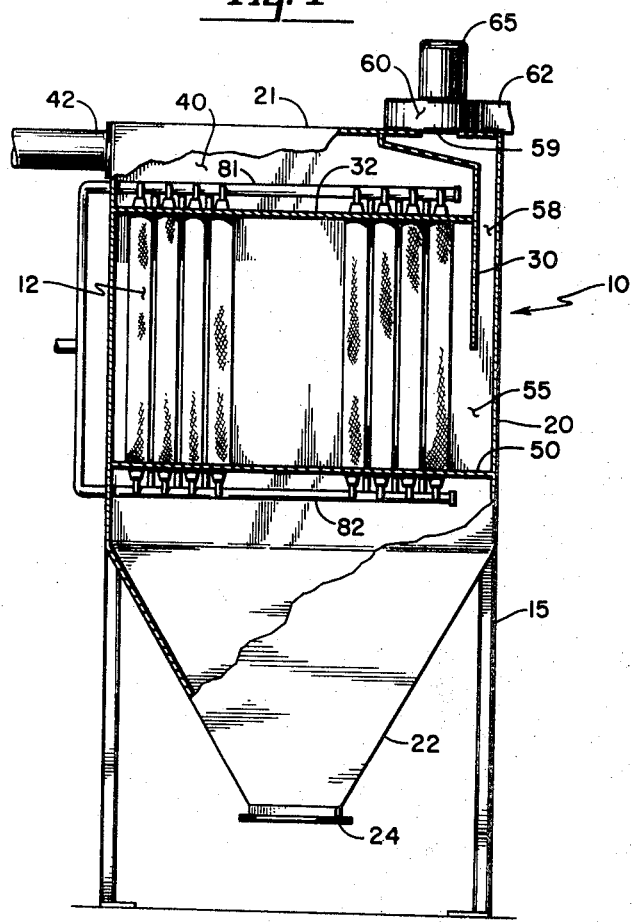
FIG. 1 is an elevation view of the tube house type filtering apparatus embodying my invention with parts in section.

My invention is an improved filtering apparatus of the tube house type which includes a novel cleaning structure and method. As shown in FIG. 1, the invention is disclosed in connection with a tube house or enclosure, indicated generally at 10, which mounts a plurality of tube type filter elements, indicated generally at 12. The filter elements are positioned in the tube house in a vertical position and contaminated air is directed through the filter elements for conventional filtering operation. The tube house enclosure 10 includes an upright frame structure 15 having enclosed sides 20, top 21, and a truncated enclosure 22 at the bottom of the same. The enclosure 22 defines the dust or contaminant chamber for the tube house and includes a gate valve or hatch 24 by means of which the contaminants are removed therefrom. Within the enclosure 10 is located a vertically positioned downwardly extending divider plate 30 which is attached to two sides and the top of the enclosure and defines, as will be hereinafter noted, one side of the upper inlet section of the enclosure. Attached to the divider plate is a baffle section 32 which is attached to three sides of the enclosure and the vertically disposed plate 30 to define the top 21 of the enclosure the inlet section 40 of the enclosure. A suitable inlet pipe or port 42 is connected thereto and contaminated air or air needing filtering is directed into the enclosure through the port or pipe 42. The baffle plate 32 has a plurality of apertures therein, indicated at 45, with each aperture having a downwardly circular angular flange 46 associated therewith. The apertures in the baffle plate are aligned in rows and provide the mounting of the upper ends of the filtering elements 12 positioned in the tube house. The filter elements 12 are tubular fabric type structures open at both extremities and the upper extremity of the tubular filter element is positioned over the circular flange 46 and secured thereto by clamping ring 47. A second divider or baffle plate 50 is positioned in the enclosure and attached to the four sides thereof adjacent to the truncated section 22 of the tube house and defining with the first baffle plate the outlet plenum or section of the enclosure, indicated at 55. The divider plate 30 extends short of the baffle plate 50 and provides a passage 58 from the outlet plenum through the space between the plate and the one wall of the enclosure, the enclosure leading to an aperture 59 in the top of the enclosure wherein an exhaust fan or blower 60 is positioned. Baffle plate 50 has a plurality of apertures 45 therein, each aperture having a circular flange section 46 surrounding the same by means of which the lower extremities of the open tubular filter element is mounted with a suitable clamping ring 47 securing this opposite extremity of the tubular filter element to the baffle plate 50. The apertures 45 in the baffles 32 and 50 are aligned and when the tubular filter elements are mounted on the respective flanges 46, they will be disposed in a spaced parallel relationship and in a vertical relationship in the outlet plenum or section 55 of the tube house. The tubular filter elements are substantially taut in their connection between the baffles 32 and 50 and require no internal support frame to hold the tubular type filters in an extended or open position. The lower or open extremities of the tubular filter elements due to the apertures 45 in the plate 50 communicate with the truncated contaminant collection chamber or section 22 of the tube house. The door or hatch 24 in this truncated portion of the tube house may be replaced by other suitable automatic means for removing the particulate accumulating in the dust chamber.

The blower 60 will operate to draw the air through the inlet plenum 40 from the port 42 with air being directed through the open upper extremities of the tubular filtering elements 12 connected to the aperture 45 in the baffle 32 allowing the air to be drawn through the interior of the tubular filter elements and through the walls thereof into the outlet plenum 55, the passage 58 between the divider plate 30 and the wall of the enclosure and to the inlet 59 of the blower wherein it is discharged at thee outlet of the blower, indicated at 62. A suitable electric motor, indicated at 65, powers the blower for moving contaminated air through the filter elements to the tube house in a normal filtering operation. As the air passes through the walls of the filter elements 12, the particulates or dust in the air will be deposited in the inner surface of the filter elements and clean air will be drawn into the outlet plenum 55 to be discharged by the blower at its outlet 62. This air may be connected from the outlet of the blower through suitable piping (not shown) to the source of the contaminated air to recirculate air for cleaning purposes. The dirt or particulates positioned on the inner surface of the tubular filter elements will be removed therefrom, as will be hereinafter noted, through pneumatic agitation of the filter elements causing the particulates to drop through the open extremity of the filter elements and the apertures in the baffle plate 50 under the influence of gravity. The particulates will be collected in the contaminant or dust chamber 22 and will be manually or automatically removed.

Figure 2:
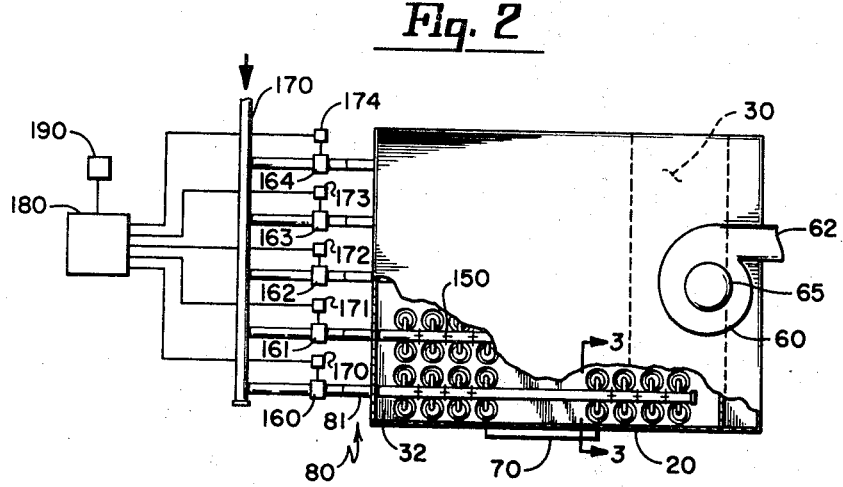
FIG. 2 is a top view of the tube house showing the arrangement of the filtering element and including a schematic circuit showing controls for the cleaning apparatus for the same.
Figure 3:
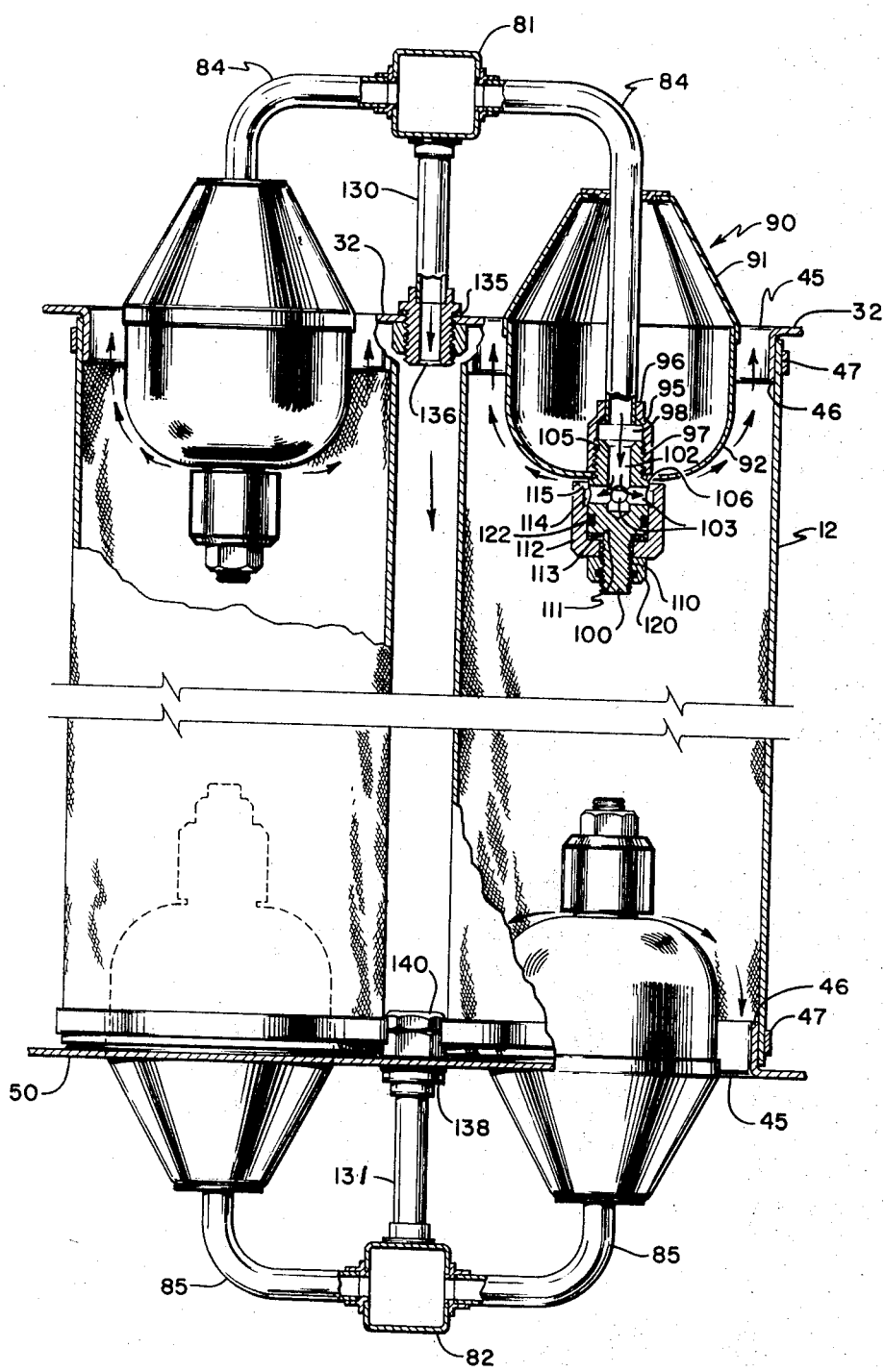
FIG. 3 is a sectional view of the filtering elements taken along the lines 3—3 in FIG. 2 with parts broken away to show the cleaning apparatus for the tube house filter elements.

The tube house filtering apparatus includes a cleaning structure which will be best seen in detail in FIGS. 2 and 3. As will be seen in FIG. 2, the apertures in the baffle 32 provide for rows of tubular filter elements, each common to the inlet plenum 40 through the apertures in the baffles to which the upper ends of the filter elements are mounted. Thus in the plan view of FIG. 2 the apertures in the plate 32 extend across the front of the tube house, as indicated by the side 20 with the access door 70 therein, with the rows being separated by spacing the permit access into the interior of the tube house for mounting the filtering elements. Each double row of filter elements have associated therewith a separate manifold 80. Each manifold having an upper and lower pipe 81, 82, as will be evident in FIG. 1 and 3, with branch pipes or arms 84, 85, connected to the main pipes 81 and 82 and being disposed over the open extremities of the tubular filter elements as evidenced by apertures 45 in the plates 32 and 50. Each of the branch pipes 84, 85, have a special nozzle configuration or structure mounted on the end of the same and located within the confines of the tubular filtering elements at the ends of the same as will be best seen in FIG. 3.

The nozzle structure is generally indicated at 90. It is identical in construction for each filter element and is located on the ends of the branch arms 84, and 85 at either end of the filter elements for all of the filter elements in the tube house. As will be seen in section in FIG. 3, the nozzle structure has a pair of stamped sheet metal parts indicated at 91 and 92. Part 91 is generally conical having the form of a truncated cone while part 92 is cup shaped with a lower curved surface generally hemispherical in form. Attached to the end of the nozzle pipe arms is a first cylindrical or part member 95 which has a shoulder recess 96 at one extremity in which the ends of the arm or pipe 84 is positioned and suitably brazed or soldered thereto. The nozzle part 95 has an inner tapped surface 97 positioned on the other end thereof with the passage 98 through the part being common to the arm or pip 84. A second plug member or part 100 of the nozzle has an aperture or bore 102 drilled through one end of the same with transversely extending or perpendicularly positioned bores 103 extending from the sides of the plug member and connected to the centrally located bore 102 to provide the air flow passage therethrough. The end of the plugged member having the bore 102 therein has a threaded surface 105 extending from a shoulder 106 thereon. The threaded surface 105 of the plug member 100 is threaded into the tapped aperture 97 in the part 95 with the cup shaped stamped member 92 positioned therebetween such that it bears against the shoulder 106 in the plug member and is clamped between the end of the nozzle part 95 at the shoulder 106 to position the same. Plug member 100 has a tapped surface 110 at its opposite extremity with a reduced or shoulder part 111 extending from this end. Positioned over this threaded extremity of plug member 100 is a cup shaped nozzle part 112 which has an aperture in one extremity which slidably fits over the threaded extremity of the plug member 100 such that the base of the same bears against the shoulder portion 111 of the plug. A suitable spring washer 113, such as a Bellville washer, is positioned between the base of the cup member 112, and the shoulder 111 of the plug member. The opposite extremity of the cup shaped member has an enlarged recessed surface 114 and a bevelled lip 115 positioned adjacent the curved portion of the stamped member 92. A nut 120, such as an elastic stop nut, is threaded over the threaded extremity 110 of the plug 100 to bear against the base of the cup shaped nozzle member 112 urging the same against the spring washer. The gap clearance between the tapered lip surface 115 of the cup shaped member and the curved surface of the stamped part 92 defines the air gap from which air will flow from the pipe 84 to create the air curtain in the end of the tubular filter element. The elastic stop nut 120 is tightened against the cup shaped member 112 with a predetermined pressure in the line or pipe 84 to adjust the flow rate so that the flow rate through the gap from the passage 98, 102, and 103 so that each nozzle will have the same rate of discharge or same volume of discharge. A suitable O-ring 122 is positioned between the cup shaped member 112 and the plug member 110 and in a suitable groove in the plug to prevent leakage of air except through the air gap. As the air is discharged from the manifold through the arms 84, 85, at the ends of the tubular filtering element, the same volume of air will be discharged at the nozzle orifice openings between the cup shaped member and the stamped or part 92. This air will have a predetermined tubulance such that the air flow will follow the curved surface of the cup shaped member 92 in a Coanda effect with the air being directed toward the open extremity of the tubular filtering element and around the parts 92 and 91. This will provide a pumping action since the same effect takes place at both ends of the tubular filtering element simultaneously reducing the internal pressure in the tubular filter element, as will be hereinafter identified. The conically shaped part 91, permits normal flow of air into the tubular filtering element 12 from the apertures in the baffle member 32 at the upper end or from the plenum 40. The same configuration is used for the nozzle at the lower extremity although air does not enter from this extremity of the tubular filter element. In addition to the arms 84 and 85 leading from the pipes 81 and 82 of the individual manifold for the pairs of rows of the tubular filtering elements in the tube house, an additional pipe or passage 130 and 131 is connected to the pipes 81 and 82. In the case of the upper side of the manifold this pipe has a suitable fitting member 135 which attaches the same to the baffle 32 with cylindrical passage 136 therethrough by means of which air may be discharged through the baffle member 32 and along the extent of the tubular filtering elements. For simplicity and construction, the lower manifold 82 with its arms 85 similarly has a pipe 131 extending therefrom which pipe serves as a mounting member through a coupler 138 connected to the lower baffle 50. This pipe, however, is sealed by means of a cap member 140, so that air is not discharged at this point.

As will be seen in FIG. 2, each manifold services or cleans two rows of tubular filtering elements which is shown in the drawings as 8 to a row or 16 in a double row. The upper and lower manifolds has the nozzle constructions 90 positioned in the upper and lower extremities of the tubular filtering element or extending through the baffles 32 and 50. In addition, on the upper side of the tube house and extending through the baffle member 32 is an external discharge pipe 130 which provides an air passage to a nozzle located equidistantly between four adjacent tubular filtering elements, as shown by the cross members in FIG. 2 at 150. As previously explained, the pipe 130 on the lower side of the tube house or extending through the baffle member 50 is sealed so that an external air discharge asymetrically located with respect to each of the individual filtering elements will provide a jet discharge which will extend between four adjacent filter elements, two in each row, to affect the shaking action of the tubular filter elements along the extent of the same and from the baffle 32 to the baffle 50 for the purpose of dislodging the particulates on the inner surface thereof. This action will take place simultaneously with a generation of the air curtains by the nozzles 90 at the extremities of each of the filter elements, which air curtains will also provide a pumping action to reduce the internal pressure in the tubular filtering elements and block any air flow into the same. Thus when compressed air is directed into each manifold individually, a double row of filter elements within a tube house are effectively taken off of the normal filtering operation by the blockage of air flow therethrough due to the generation of air curtains at the extremities of the same. Simultaneous with this action, the shaking action caused by the discharge through the pipe and nozzle 136 will effectively shake the filter elements in the double row and common to the manifold to dislodge particulates in the same and allow the particulate to be dropped by the force of gravity into the contaminant chambers 22 of the tube house. During this operation, the remainder of the filter elements in the tube house will be providing a normal filtering operation receiving contaminated air from the plenum 40 and discharging cleaned air through the walls of the remaining filter elements into the outlet plenum 55 and through the fan to the fan discharge outlet 62.

As will be seen in FIG. 2, and is set forth in the copending application of Roger Wales, referred to above, the improved filtering apparatus is provided with a cleaning apparatus which permits continuous on-line operation of the tube house. In FIG. 2 the tube house is shown as having five separate manifold assemblies each having associated therewith a separate valve member, such as is indicated at 160 – 164, the valve members connecting the separate manifolds through a common inlet pipe 165 which is connected to a source of high pressure air which is continuously available for cleaning of the filter elements. This high pressure is at a pressure considerably higher than the pressure of normal air flow through the tube house to effect the generation of the air curtains and the shaking of the tubular filtering elements of the cleaning operation. The individual valves 160 – 164 are operated through electromagnets 170 – 174 which are selectively energized from the sequencer 180 to which they are electrically connected. The sequencer or synchronizer may take varying forms and is shown in block form. It may be operated by a timer from a suitable electric source to selectively select the manifold as evidence by electromagnets 170 – 174 of the valves 160 – 164 to which the high pressure air supply 165 is connected for cleaning operation. A suitable pressure sensor 190, shown in block in FIG. 2, may be connected to a sequencer as an override device to prevent operation of the sequencer as an override device to prevent operation of the sequencer or synchronizer under conditions where air flow through the tube house indicates that the tubular filter elements therein are not dirty. Thus with the improved filtering apparatus as shown on the drawings 1/5th of the total number of filtering elements will be cleaned at any one time and the remaining 4/5th or 80 percent of the filtering elements in the tube house will be available for normal filtering operation. The cleaning operation may be effected by a single jet pulse through operation of the respective valves or a series of pulses as may be required to effectively shake the tubular filter elements to remove the particulate therefrom. The generation of the air curtain at the extremities of the filtering elements not only prevents contaminated air flow into the same during the cleaning operation but reduces the internal pressure of the same to aid in the pneumatic agitation of the respective filtering elements during the cleaning operation and to permit a limited amount of reverse air flow through the walls of the filtering elements to additionally dislodge particulates therefrom. With the cessation of the air curtains, normal in-flow to the filtering elements of contaminated air will aid in moving the particulates into the dust collecting section or contaminate chamber 22 and prevent any reintrainment of the partciles in the tubular fabric. Thus the improved cleaning apparatus subjects the individual tubular filtering elements not only to the generation of the air curtain at the ends of the same to prevent normal air flow into the same but also provides a pumping action to reduce the internal pressure and aid in the agitation of the walls of the filter with the externally applied pulse from the nozzles located between the same in external of the same. Normally a single pulse cleaning or agitation will affect proper cleaning of the filter so that the filters may be maintained in a partially cleaned condition at all times providing for increased filtering efficiency with a minimum of maintenance in connection with the tube house cleaning operation.

The alternate embodiments of the tube house filtering apparatus and more particularly of the cleaning portion thereof are shown in FIGS. 4 and 5 with modified versions of the tube house and mountings of the tubular filter elements therein. Each employ one-half of the cleaning apparatus of the structure shown in FIG. 1 and further provides bottom entry or inlet of contaminated air into the tube house, as will be hereinafter defined. Under certain conditions, where contaminated air is taken from a source or environment in which the contaminants or particulates to be filtered from the air are the type which become rancid or spoil with age. In particular, in an environment in which the production or manufacture of comestibles take place and air therefrom is to be filtered it is desirable to have the inlet side of the tube house accessable for complete cleaning, such as washing, scrubbing and the like, to avoid conditions hazardous to health and the breathing of the germs and nauseous gases.

Therefore, as shown in FIG. 4, the tube house 10 employs basically the same baffle configurations of the upper baffle 32 and the lower baffle, the divider plate 34 and the enclosing structure 20, 21, surrounding the same as that disclosed in FIG. 1. Thus, the sides 20 and top 21 of the enclosure provide an enclosed tube house with the truncated enclosure 22 at the bottom of the same defining the dust or contaminant chamber and including a gate valve or hatch 24 at the base of the same. The baffle 32 and the top 21 of the enclosure no longer provide or define the inlet plenum for the tube house, however, and is a sealed unit. The downwardly extending vertical divider plate 34 provides a portion of the outlet plenum which exists between the plates 32 and 50 and the passage to the blower 60 designed to draw air into the plenum. Thus, in FIG. 4 with the same tube house configuration the blower 60 operated by the electric motor 65 and having the outlet 62 is positioned on top of the enclosure but the inlet passage 42 is connected to the contaminant chamber below the baffle 50 and common with the truncated enclosure 22 providing the dust chamber. In this embodiment the tubular filtering elements which are open at both extremities are mounted on the baffles 32 and 50 in the same manner. However, the baffle 32 may either by formed by providing indentations rather than apertures to define the mounting collars for the upper end of the tubular elements or they may be plugged, as indicated at 32A. In this embodiment, the tubular filtering elements 12 will be mounted on the shoulders formed in the baffles 32 and 50 in the same manner as shown in the disclosure in FIG. 3 with the straps 47 surrounding the same and securing the same to the shoulders. In this embodiment, however, only the lower extremity will have the apertures or openings through the baffle 50 and the chamber above the baffle 32 will be sealed from the plenum and to the interior of the tubular type filter elements 12. Only one-half of the cleaning apparatus will be employed such that the pipe or manifold 82 will lead to the nozzle structures 90 positioned in the lower extremities of each of the filter elements 12 and extending from the manifold 82 to the branch pipes 85 to the respective nozzles. In this embodiment, the pipe 131 will lead through the baffle 50 and the cap 140 will be omitted so that an aperture, such as 136, in FIG. 3 will be provided for allowing the jet of air external of the tubular type filters to be applied from the bottom of the tube house and in an upper direction. Thus only one-half of the cleaning hardware will be required and contaminated air will be restricted to the dust chamber 22 and the inner side of the tubular filter elements. The cleaning apparatus will be operated from the sequencer 180 and through the manifold 165, the electro-magnets 170 – 174 and through the control valves 160 – 164 in the same manner. These will control air flow the lower manifold pipe 82 only. Cleaning will be effected in the desired sequence with the same operation as in the disclosure of FIG. 2. The air curtains will be generated at the lower extremities and will work against a sealed extremity of the tubular filter elements at the upper side thereof, as defined by the mounting of the upper ends on the baffle 32 which are plugged, so that collapse of the tubular filter elements 12 and the application of the externally applied pulse through the pipe 131 and along the extent of the tubular filter elements will take place to effect the same cleaning procedure as heretofore defined. Thus, with the version or embodiment shown in FIG. 4, only one-half of the cleaning hardware is required, and base portion of the tube house is readily accessible for additional cleaning to insure that any deposit of particulates on the inlet side will be common to the dust chamber and may be cleaned therefrom through cleaning processes in addition to the removal of the dust from the hatch 24. This will enable cleaning of the tube house apparatus to meet health requirement standards.

The embodiment shown in FIG. 5 is substantially identical to that of FIG. 4 from a functional standpoint in that it employs only half of the cleaning apparatus and provides for the inlet air passage 42 to be directed into the contaminate chamber 22 of the tube house. The tube house 10 in this embodiment no longer includes the baffles 32 and 30 and provides only for the single baffle 50 defining with the truncated portion of the tube house 22 the dust contaminate chamber and inlet side of the tube house. The remaining portion of the enclosure defined by the sides 20 and top 21 above the baffle 50 is the plenum or outlet side of the tube house and the blower or exhaust means 60 is mounted on the side of the enclosure, for convenience, to draw air into the filter elements 12. In this embodiment, the filter elements are bag type elements closed at the upper extremity and suspended within the tube house 12 by means of suitable hangers indicated at 150. Thus the upper extremity of each of the bags will be connected to the top 21 of the enclosure through separate hanger means, the details of which are omitted for simplicity since such structures are conventional. The lower extremities of the tubular filtering elements 12 are again mounted on the collar portions of the baffle 50 surrounding the apertures therethrough and suitable securing bands 47 secure these lower extremities to the baffle 50. The cleaning nozzles 90 again are directed into the open extremities at the apertures in the baffle 50 with the same shape and configuration as shown in FIG. 3. In addition, the lower manifold 82 provides the jet passage through the pipe 131 to the uncapped nozzle, similar to the passage 136, in FIG. 3 directing air upward along the extent of the tubular filtering elements in the outlet or plenum chamber. The manifold 82 is again connected through the valves 160 – 164, to the supply manifold or pipe 165 and the valves are controlled by the electro-magnets 170 – 174, from the sequencer 180. Thus with this embodiment a slightly different type of filter element is employed which is open at one extremity only, but the same configuration of a bottom entry to the tube house and to the tubular filtering elements is employed. Thus the inlet side or port for contaminated air is restricted to the area below the baffle 50 and in the dust contaminate chamber 22 of the tube house. The normal filtering operation and cleaning will be identical with that defined in the sequence described in connection with FIG. 2. The action of the nozzles 90 and the externally applied jet pulse are also identical with that defined in connection with FIGS. 3 and 4. As in FIG. 4, they are applied to the bottom portion of the filter elements 12. This minimizes the cost of the cleaning equipment involved and insures a readily cleanable and maintanable tube house configuration for special environments.

In considering this invention it should be remembered that the present disclosure is illustrative only and the scope of the invention should be determined by the appended claims.

What is claimed is:

1. A filtering apparatus comprising a frame, a plurality of tubular fabric-type filter elements open at both extremities and positioned within said frame, a first divider plate positioned in the frame and having a plurality of openings therein with said first plate mounting the upper extremity of each of said filter elements at said plurality of openings, a second divider plate positioned in the frame having a plurality of openings therein and mounting the opposite extremity of each of said filter elements to position the filter elements in the elongated vertical position, means including the frame connected to the second divider plate and defining a dust chamber located beneath the second divider plate and having a discharge opening therein, means included in said frame and with at least one of said divider plates defining a sealed plenum chamber through which air is directed to the filtering operation of the filtering apparatus, means connected to the plenum chamber for causing contaminated air to be directed into the filtering elements of the filtering apparatus at the open upper ends thereof and through the walls of the filtering elements with the particulates being collected on the inner walls of the tubular filtering elements, and means including a high pressure air supply and associated with the open extremities of each of the tubular filtering elements for selectivity creating pulsed air curtains at the ends of the certain of said filtering elements to block air flow therethrough and create a drop in pressure within said certain of said filtering elements and simultaneously creating a jet air pulse on the outside of certain filtering elements causing collapse of said certain filtering elements to remove particulates from the inner walls thereof and causing the particulates to be directed into the dust chamber through the force of gravity thereon and the resumption of air flow through the filtering elements.

2. The filtering apparatus of claim 1 in which the means included in the high pressure air supply and associated with the tubular filtering elements to create air curtains at the extremities of the tubular filtering elements include jet nozzles positioned at the extremities of the tubular filtering element and directing air therefrom to form air curtains at the extremities of the tubular filtering elements with additional nozzle means positioned on the outside of said filtering elements and creating a jet air pulse traveling the extent of the filtering elements from the upper extremities thereof to remove particulates from the inner walls of the filtering element.

3. The filtering apparatus of claim 2, in which the nozzles at the extremities of the filtering elements direct air out of the confines of the filtering element and create a pumping action therein and a drop in pressure within the filtering element simultaneously with the jet pulse on the outside of the filtering element to cause collapse of the filtering elements in the removal of the particulates therefrom.

4. The filtering apparatus in claim 3 in which the nozzle means at the extremities of the filtering element and the jet nozzle positioned outside of the filtering element are connected to a common manifold and to a high pressure air supply through a valve which controls simultaneous flow from the high pressure air supply to the nozzle means and the jet nozzle means of the filtering elements.

5. The filtering apparatus of claim 4 in which the frame with the first and second dividing plates therein have aligned apertures arranged in rows with the tubular filter elements connected between the dividing plates and common with the rows of apertures, and in which the common manifold is connected to nozzle means for two rows of the tubular filtering element in the frame with the nozzle means positioned in the opening extremities of the rows of tubular filtering elements and with the jet nozzle positioned equidistantly between the adjacent filter elements and between the rows of tubular filtering elements.

6. The filtering apparatus of claim 5 in which the nozzle means that are positioned into the open extremities of each of the filtering elements have a hemispherically shaped surface thereon with orifices directing air flow across the hemispherically shaped surfaces and out of the confines of the tubular filtering element in a Coanada type flow to provide the pumping action in evacuating air from within the tubular filtering element as it generates the air curtain at the extremities of the tubular filtering element.

7. The method of cleaning tubular fabric type filter elements which are open at both extremities and which filter air flow by admitting contaminated air through one extremity and filter particulates therefrom by passing air through the walls thereof comprising, creating pulsed air curtains at the open extremities of each tubular filter element during a normal filtering operation to block contaminated air flow into the filter element and causing a drop in pressure therein, and simultaneously subjecting the tubular filter element to an air pulse directed along the extent of the same and on the outside of the filtering element such that the drop in pressure within the filtering element and the jet pulse on the outside of the filtering element cause the walls of the tubular filtering element to collapse inwardly dislodging the particulates on the inner surface thereof and thereafter removing the air curtains at the ends of the filtering elements and stopping the jet pulse on the outside of said blocked filtering element and permitting contaminated air flow into said filtering element to cause the particulates on the inner wall of the filtering element to be discharged through the other end of said filtering element.

8. The method of cleaning tubular fabric type filter elements of claim 7 in which the air curtains generated at the open ends of the filter element are created by directing pulse air flow under pressure higher than the pressure of the contaminated air flow and in a direction toward the open extremities of the tubular filter element to reduce pressure within the tubular filter element.

9. The method of cleaning tubular fabric type filter elements of claim 8 in which selected filter elements have air curtains generated at the extremities of the same simultaneously with a jet pulse being directed to the outside surface of the selected tubular filter elements while the remainder of the filter elements receive contaminated air flow to maintain the normal filtering operation therethrough and in which air flows through the filtering element in the normal filtering operation and the jet pulse on the outside of the same create an outside air pressure on the selected filtering elements to cause a reverse air flow therethrough as well as a collapse of the tubular filtering element to dislodge particulates from the same.

10. The method of cleaning tubular fabric type filter elements of claim 9 in which the steps of creating pulsed air curtains in the tubular filtering elements and generating a jet pulse on the outside of the same for those filtering elements being cleaned is repeated only once before selecting other filter elements for cleaning.

11. A filtering apparatus comprising, an enclosure having a pair of spaced dividing baffles positioned therein in a parallel relationship and dividing said enclosure into upper lower and intermediate sections with respect to said enclosure, each baffle having a plurality of openings therein with a transversely extending collar surrounding the apertures and projecting between the baffles of the enclosure, a plurality of tubular filament elements open at both extremities positioned in the intermediate section of the enclosure with the extremities of the same mounted over the transversely extending collars and secured thereto with the tubular elements extending between the baffles in spaced parallel relationship, an inlet air passage positioned through the enclosure in the upper section thereof communicating with the upper section, an air outlet passage positioned through the enclosure communicating with the intermediate section of the enclosure and connected to means for moving air through the enclosure from the upper section and the tubular elements to the intermediate section and the outlet therein, a contaminant withdrawal port positioned in the enclosure in the lower section thereof, and a plurality of cleaning manifolds positioned in said enclosure, each manifold being associated with a row of tubular filter elements in the enclosure and having interconnected upper and lower branch pipes with nozzles means positioned in the ends of the filter elements of said row and a jet nozzle positioned between adjacent filter elements in the row external of the filter elements, said manifolds being selectively connected to a high pressure air supply to create an air curtain in the ends of each of the filter elements in a row and an air jet burst along side of the exterior of the filter elements simultaneously to dislodge contaminants on the inner surface of the tubular filter elements permitting gravity discharge of the contaminants through the tubular filter elements and into the lower section of the enclosure.

12. The filtering apparatus of claim 11 in which each cleaning manifold is positioned common to a pair of adjacent rows of tubular filter elements within the enclosure and in which the jet nozzle is positioned equidistantly between adjacent filter elements in the pair of rows and adjacent the baffle common to the upper section off the enclosure to direct an air jet burst along the extent of the tubular filter element within the intermediate section of the enclosure and toward the lower section of the enclosure.

13. The filtering apparatus of claim 12 in which an air supply is connected to each manifold for a period of time sufficient to provide an air curtain at the extremities of each of the tubular filter elements and a single jet burst of such duration to agitate each of the tubular filter elements along the extent of the same and provide for a reverse air flow through the filter element.

14. The filtering apparatus of claim 13 in which the jet nozzles of the manifold are positioned equidistantly from four adjacent tubular filter elements.

15. The filtering apparatus of claim 14 in which the nozzle means positioned in the ends of each of the filter elements has a hemispherically shaped surface with an orifice associated therewith to provide for turbulant air flow around the hemispherical surface and toward the open extremities of the tubular element to create the air curtain at the ends of the same.

16. The filtering apparatus of claim 15 in which the nozzle means in the ends of the filter elements produce a Coanda effect and a pumping action to reduce internal pressure within the tubular filter element.

17. A filtering apparatus comprising a frame, a plurality of tubular fabric type filter elements opened at both extremities and positioned within said frame, a first divider plate positioned in said frame and having means mounting the upper extremity of each of the filter elements, a second divider plate positioned in the frame and having a plurality of openings therein and mounting the opposite extremity of each of the filter elements to position the filter elements in an elongated vertical position, means including the frame connected to the second divider plate and defining a dust chamber beneath the second divider plate and having a discharge opening therein, means included in said frame and with at least one of said divider plates defining a sealeed plenum chamber through which air is directed in the filtering operation of the filtering apparatus, means connected to the plenum chamber for causing contaminated air to be directed into the filtering elements of the filtering apparatus of the opened ends thereof and through the walls of the filtering elements with the particulates being collected on the inner walls of the filtering elements, and means including a high pressure air supply and associated with the open extremity of the tubular filtering elements for selectively creating pulsed air curtains at the ends of certain of the filtering elements to block air flow therethrough and create a drop in pressure within certain of the filtering elements and simultaneously creating a jet pulse on the outside of certain of the said filtering elements causing collapse of said certain of said filtering elements to remove particulates from the inner walls thereof and causing the particulates to be directed into the dust chamber through the force of gravity thereon.

18. The filtering apparatus of claim 17 in which the inlet air is directed through the dust chamber and the opposite extremities of the filter elements at the second divider plate with the first divider plate being sealed at the means mounting the upper extremities of the filtering elements thereon.

19. The filtering apparatus of claim 18, wherein the means selectively creating the pulsed air curtains at the ends of certain of the filter elements and the jet air pulse on the outside of certain of said filter elements is located only at said opposite extremities of said filter elements adjacent to said second divider plate.

20. The filtering apparatus of claim 17 in which the means mounting the upper extremities of each of the filter elements in the first divider plate are indentations created in a solid plate to divide mounting collars closing said upper extremities of the tubular elements which are secured thereto.

21. A filtering apparatus comprising a frame, a plurality of tubular fabric-type filter elements opened in at least one extremity and positioned within said frame means mounting the upper extremities of each of the filter elements, a divider plate positioned in the frame and having a plurality of openings therein and mounting the opposite extremity of each of the filter elements to position the filter elements in an elongated vertical position, means including the frame connected to the divider plate and defining a dust chamber beneath the divider plate and having a discharge opening therein, second means included in said frame and cooperating with said divider plate defining a sealed plenum chamber through which air is directed in the filtering operation of the filtering apparatus, means connected to the plenum chamber for causing contaminated air to be directed into the filtering elements of the filtering apparatus of the opened ends thereof and through the walls of the filtering elements with the particulates being collected on the inner walls of the filtering elements, and means including a high pressure air supply and associated with the open extremity of the tubular filtering elements for selectively creating pulsed air curtains at the ends of the certain of the filtering elements to block air flow therethrough and create a drop in pressure within certain of the filtering elements and simultaneously creating a jet pulse on the outside of certain of the said filtering elements causing collapse of said certain of said filtering elements to remove particulates from the inner walls thereof and causing the particulates to be directed into the dust chamber through the force of gravity thereon.

22. The filtering apparatus of claim 1 in which the means included in the high pressure air supply and associated with the tubular filtering elements to create air curtains at the open extremities of the tubular filtering elements are nozzle means directing air to form air curtains at the extremities of the tubular filtering elements, and with additional nozzle means positioned on the outside of the filtering elements and creating a jet air pulse traveling the extent of the filtering elements from the lower open extremity thereof to remove particulates from the inner walls of the filtering element.

23. The filtering apparatus of claim 22, in which the nozzles at the open and lower extremities of the filtering elements direct air out of the confines of the filtering element and create a pumping action thereon and a drop in pressure within the filtering element simultaneously with the jet pulse on the outside of the filtering element to cause collapse of the filtering elements in the removal of the particulates therefrom.

24. The filtering apparatus of claim 23 in which the nozzle means positioned in the open extremity of each of the filtering elements have a hemispherically shaped surface thereon with orifices directing air flow across the hemispherically shaped surfaces and out of the confines of the tubular filtering element in a Coanda type flow to provide the pumping action in evacuating air from within the tubular filtering element as it generates the air curtain at the extremities of the tubular filtering element.

25. The method of cleaning tubular fabric-type filter elements which are open at at least one extremity and which filter air flow by admitting contaminated air flow through one open extremity and filter particulates therefrom by by passing air through the walls thereof comprising, creating pulsed air curtains at the open extremity of each of the tubular filtering elements through which contaminated air flow occurs during the normal filtering operation to block contaminated air flow into the filter elements and causing a drop in the pressure therein, and simultaneously subjecting the tubular filtering element to an air pulse directed along the extent of the same and on the outside of the filtering element such that the drop in pressure within the filtering element and the jet pulse on the outside of the filtering element caused the walls of the tubular filtering element to collapse inwardly dislodging the particulates on the inner surface thereof, and thereafter removing the air curtains at the open ends of the tubular filtering elements and stopping the jet pulse on the outside of the said blocked filtering element to permit the particulates on the inner walls of the tubular filtering element to be discharged through an open extremity of the tubular filtering element.

26. The method of cleaning tubular fabric-type filter elements of claim 25 in which the air curtains are generated at the lower ends of the tubular filtering elements by creating pulsed air flow under pressure higher than the pressure of the contaminated air flow and in a direction toward the open extremity of the tubular filtering elements to reduce pressure within the tubular filtering elements.

27. The method of cleaning tubular fabric-type filter elements of claim 26 in which selected filter elements have air curtains generated at the extremities of the same simultaneously with the jet pulse being directed on the outside of the selected tubular filtering elements while the remainder of the filter elements receive contaminated air flow to maintain a normal filtering operation therethrough and in which air flow through the filtering element in a normal filtering operation with the jet pulse on the outside of the same creating an outside air pressure on the selected tubular filtering elements to create a reverse airflow therethrough as well as a collapse of tubular filtering elements to dislodge particulates from the same.

* * * * *

UNITED STATES PATENT OFFICE
CERTIFICATE OF CORRECTION

Patent No. 3,838,555          Dated October 1, 1974

Inventor(s) John W. Kubiak

It is certified that error appears in the above-identified patent and that said Letters Patent are hereby corrected as shown below:

Column 4, line 51, delete "pip" and insert - pipe -

Column 7, line 34, delete "partciles" and insert - particles -

Column 8, line 25, after the word "either" delete "by" and insert - be -

Column 13, line 24, delete "sealeed" and insert - sealed -

Signed and sealed this 26th day of November 1974.

(SEAL)
Attest:

McCOY M. GIBSON JR.
Attesting Officer

C. MARSHALL DANN
Commissioner of Patents